Jan. 26, 1954     C. E. MISCH     2,667,285
CYLINDRICAL CONTAINER WITH SLIDABLE CLOSURE
Filed June 24, 1950     3 Sheets-Sheet 1
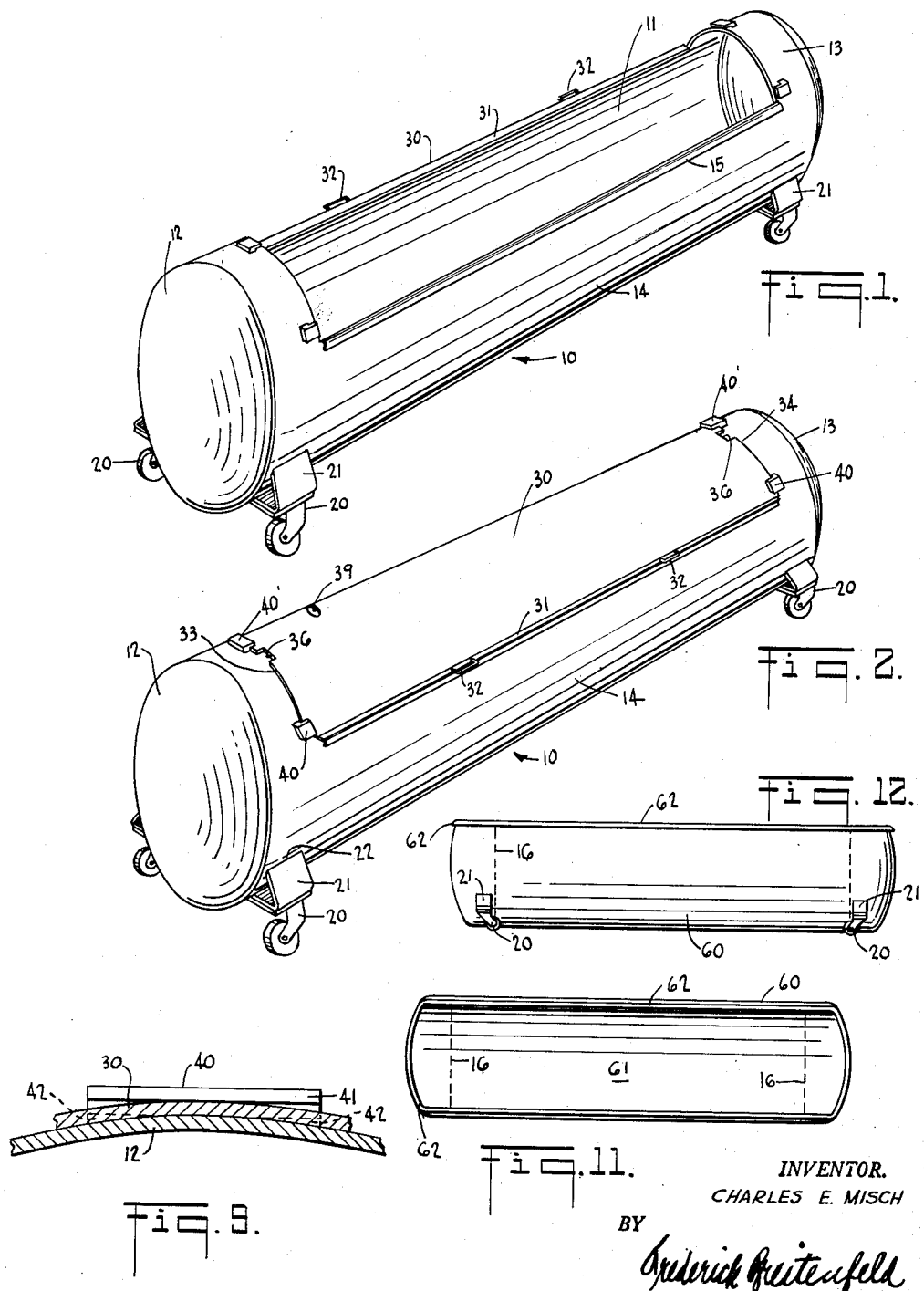
INVENTOR.
CHARLES E. MISCH
BY
*Frederick Breitenfeld*
ATTORNEY

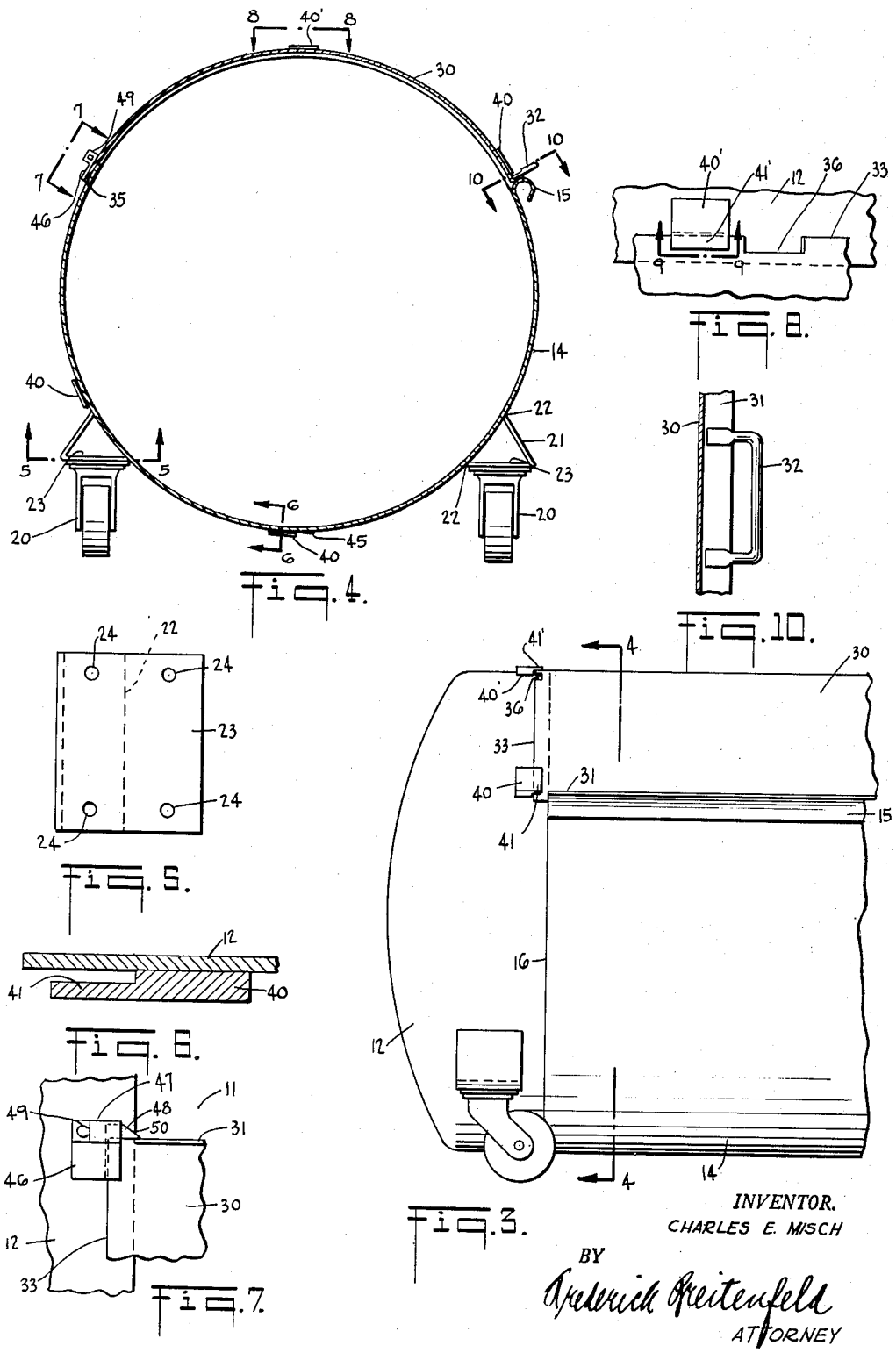

Jan. 26, 1954 C. E. MISCH 2,667,285
CYLINDRICAL CONTAINER WITH SLIDABLE CLOSURE
Filed June 24, 1950 3 Sheets-Sheet 3
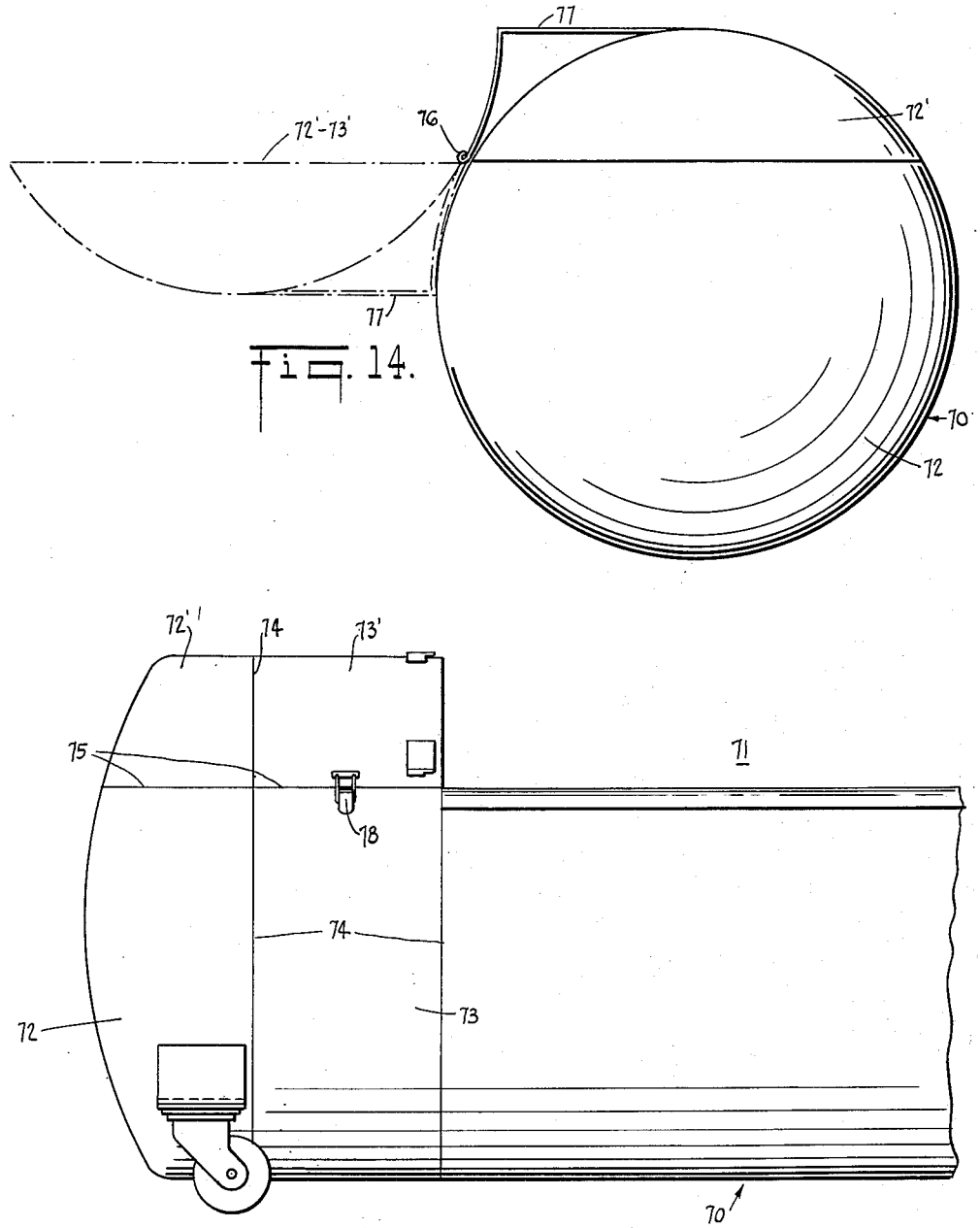
INVENTOR.
CHARLES E. MISCH
BY
*Frederick Breitenfeld*
ATTORNEY Patented Jan. 26, 1954

2,667,285

UNITED STATES PATENT OFFICE 2,667,285

CYLINDRICAL CONTAINER WITH SLIDABLE CLOSURE

Charles E. Misch, New York, N. Y.

Application June 24, 1950, Serial No. 170,096

5 Claims. (Cl. 220—41)

The present invention relates generally to containers and has particular reference to troughs of the type which are used for the holding and storage of dough or dough forming materials during commercial baking processes.

It is common practice in the baking industry to subject certain kinds of dough mixes to a seasoning process. For example, in the manufacture of bread it is usual to form a sponge dough or "sponge" of water, flour, yeast and yeast foods, and to allow such sponge to stand and rise for a fermentation period of two to three hours or more, after which other ingredients are usually added to form the dough utilized in the baking process.

The storage of dough mixtures, for purposes of fermentation or seasoning, is presently performed in large vessels resembling bath-tubs, more or less rectangular in over-all shape. Each such vessel or trough is provided with a separate hood-like cover which shields the contents of the trough from air drafts which would otherwise remove moisture from the mix and form an undesirable crust on its surface. After the desired period of storage, the contents of the trough is dumped into a larger vessel or mixer, usually by lifting the trough bodily and inverting it.

Because of their shape and bulkiness, the ordinary trough covers are difficult to handle, and it is often necessary to employ special hoisting machinery to lift the covers and to hold them aside. Another disadvantage lies in the relatively large amount of space that is required to accommodate the covers when they are not in use. Moreover, the covers, and the troughs as well, are difficult to maintain in clean sanitary condition because of the corners and crevices which a rectangular shape produces.

It is a general object of my invention to provide a dough trough of novel structural character, well suited to afford all the necessary features of accessibility and handling, but obviating the difficulties and disadvantages of the conventional types of troughs and covers as outlined above.

A more particular object of the invention is to provide an improved dough trough and cover combination in which both the trough and the cover present smooth continuous interior surfaces which are readily cleanable.

A feature of the present improvement resides in the provision of a dough trough in the form of a cylindrical container having curved end walls and an opening in the cylindrical portion, the end walls merging gradually into the cylindrical body so as to present a smooth continuous interior.

A further feature of the invention lies in the provision of a dough trough cover conforming in shape to the cylindrical trough body and slideable thereon between closed and open positions, whereby in either position the cover requires no space other than that generally occupied by the trough itself. The cover is specially designed so that while it normally is attached to and hugs the contour of the trough whether in open or closed position, nevertheless it may be readily detached and removed to facilitate cleaning of its interior surface.

A still further feature of the invention lies in the provision of means whereby the slideable cover, when moved to open the trough, is automatically latched in open position to allow the trough to be more readily hoisted and turned for emptying the contents.

In one embodiment of the invention, the trough is provided with a cylindrical body whose end portions are formed of separable parts which may be moved apart for ready access to the interior surfaces to facilitate cleaning thereof.

These objectives, and such other objects and advantages as may hereinafter appear or be described, are attained by the structures shown in the several embodiments of the invention illustrated in the accompanying drawings, wherein:

Figure 1 is a perspective view of the preferred embodiment of the invention showing the dough trough with its slide cover in open position;

Figure 2 is a perspective view similar to Figure 1 but with the cover shown in closed position;

Figure 3 is an enlarged side elevation of one end of the trough;

Figure 4 is a sectional view taken along line 4—4 of Figure 3;

Figure 5 is an enlarged bottom view (along line 5—5 of Fig. 4) of one of the caster support brackets.

Figure 6 is a fragmentary cross-sectional view, showing a cover retaining bracket, taken on line 6—6 of Figure 4;

Figure 7 is a fragmentary plan view, showing a cover holding latch, taken in the direction 7—7 of Figure 4;

Figure 8 is a fragmentary plan view taken in the direction 8—8 of Figure 4, showing a cover retaining bracket in its relation to the cover removal notch;

Figure 9 is an enlarged cross-sectional view taken along line 9—9 of Figure 8;

Figure 10 is a view of one of the cover handles taken along line 10—10 of Figure 4;

Figure 11 is a top plan of a modified dough trough;

Figure 12 is a side elevation of the trough shown in Figure 11;

Figure 13 is a side elevation showing one end of another modified trough; and

Figure 14 is an end view of the trough shown in Figure 13.

The preferred embodiment of my improved dough trough is illustrated in Figs. 1-10 and comprises a cylindrical receptacle 10 formed of metal or other suitable material, horizontally disposed and provided with a pair of casters 20 at each end to facilitate movement of the trough from place to place. The container is open at its top as indicated at 11 in Fig. 1 and is provided with a cylindrically shaped cover 30 which slides on the receptacle to cover opening 11 as shown in Fig. 2.

The trough 10 is formed with a smooth interior surface devoid of corners and crevices throughout its entire extent. This prevents accumulation of dough or dough mixtures and permits cleaning of the interior with ease and facility. For this purpose the ends of the cylinder 10 are closed by rounded portions 12 and 13 which blend smoothly into the cylindrical wall 14.

One method of forming the trough to meet these requirements in a practical manner and at low cost is to form the central portion 14 of flat sheet material bent into cylindrical form with two side edges spaced to provide the opening 11, one of the edges being longitudinally turned to form a lip 15 (best shown in Figs. 1 and 4) which stiffens the body of the trough and presents a smooth, cleanable, curved edge at one side of the receptacle opening. The outer edge of lip 15 is spaced from the trough body 14 to permit cleaning therebetween. At each end of the cylindrical portion 14 is welded a rounded cup-shaped end piece, along lines such as the weld line 16 shown in Fig. 3. These end pieces 12 and 13 are preferably die drawn and are commonly known in the steel industry as "Bumped Heads." The bumped heads of course are chosen with a diameter equaling that of the cylindrical portion 14 so that their edges may be butt-welded together presenting in the finished trough a continuous smooth interior surface even along the weld lines.

For supporting the trough, a pair of angle brackets 21 are welded to the exterior of the trough along the bracket edges 22, each bracket presenting a substantially horizontally disposed face 23. The faces 23 are suitably apertured to receive securing means for attachment of conventional caster assemblies 20.

The slide cover 30 is preferably a blank of sheet material which is substantially rectangular and which is bent into cylindrical shape conforming substantially in inner diameter to the external diameter of the central portion 14 of the trough. The cover extends a circumferential distance sufficient to cover the opening 11 which in the embodiment illustrated is approximately one third the circumference of the vessel. One longitudinal edge of the cover is flanged at 31 for stiffening purposes and also for abutting the lip 15 of the trough opening to stop the slide cover in its closed position. A pair of handles 32 are preferably welded or otherwise secured to the flange 31 to facilitate the grasping and movement of the cover. The cover may be apertured at 39 to permit viewing of the contents and for possible insertion and removal of temperature measuring instruments.

For securing the cover to the trough in a manner which will permit sliding of the cover between open and closed positions, a plurality of cover retaining brackets 40, 40' and 46 may be employed. Preferably these are rectangular, flat members from one face of which a rectangular portion is removed leaving an overhanging flange 41 (see Figures 6, 8 and 9). One flat face of the bracket may be welded to the curved surface of the trough as indicated at 42 in Fig. 9. Since the depth of the removed portion of the bracket is preferably slightly greater than the thickness of cover 30 so as to permit sliding of the cover therein, the brackets when affixed to the cylindrical trough body provide space therebetween which is of smallest depth centrally of the bracket and increases in depth toward both sides as best shown in Fig. 9. This has the advantage that, in effect, enlarged mouths are provided under straight flange 41 into which the cover may easily enter from either direction, the frictional securement of the cover being limited to the central line areas of each bracket.

A plurality of brackets 40, 40' and 46 are affixed to the trough in the manner described and spaced about its circumference for approximately two thirds of its extent so as to hold the cover to the trough even when opening 11 is fully uncovered. The brackets are paired so as to engage both side edges 33 and 34 of the cover under the flanges 41. The cover flange 31 terminates short of edges 33 and 34 (see Fig. 3) to avoid striking the retaining brackets and to permit sliding movement of the cover from its closing position (Fig. 4) to its fully open position in which the rear edge 35 of the cover engages stop members 45. It is therefore apparent that the slide cover closely conforms to the body of the trough and remains attached thereto in all of its positions. Particularly when in its open position the cover lies within the general configuration of the trough, eliminating the need for extra storage space for the cover.

It is usual to lift the trough and to tilt it for emptying the contents into a mixer or the like. To permit this to be done without danger of undesired closing movement being imparted to the open cover, means are provided on the trough for automatically latching the cover in open position. To this end certain of the cover retaining brackets 46 are each provided with an integral or separate latch 47 including plunger 48, spring pressed outwardly, and a handle 49 for retracting the plunger (see Fig. 7). The plunger 48 has a beveled surface 50 facing the trough opening 11 and extending into the path of cover flange 31, so that when the cover moves from closed to open position the cover flange strikes surface 50 camming the plunger 48 out of the path of the flange against the urgency of the latch spring (not shown). Once the cover flange has passed the plunger, the latter will be forced outwardly by its spring to hold the cover from return movement until such time as the latch is manually released by a pull on the handle 49.

In order to facilitate access to the interior surface of cover 30 for cleaning, means are provided for removing the cover from the trough. This can be done by providing a pair of cut-outs or notches 36 in the cover 30 (Figs. 2 and 8). Each notch is of slightly greater width and depth than the overhanging flanges 41' on a pair of foreshortened cover retaining brackets 40' preferably located at the top of the trough. The notches 36 are in a predetermined location so that when the cover is moved to the left in Fig. 4 its flange 31 will be clear of the brackets 40 adjacent the lip 15 when the notch 36 becomes aligned with the brackets 40'. At this time the rear edge 35 of the cover will be engaged by brackets 46. The cover may then be lifted slightly to pass brackets 40' through the aligned cover notches 36 so as to clear the cover from these brackets. The cover may then be lifted in a forwardly upward direction so as to slide the rear edge 35 forwardly of brackets 46, thus entirely freeing the cover from the trough. After cleaning, the cover may be reassembled with the trough by following a reverse procedure. First the rear edge of the cover is inserted under brackets 46. Then the cover is moved rearwardly until notches 36 align with brackets 40'. The cover may then be dropped so that brackets 40' pass through the notches 36, and finally the cover is slid forwardly to engage the cover under brackets 40.

In Figs. 11 and 12 I have illustrated a modified trough 60 in which the slide cover is omitted. Trough 60 is a cylindrical container with rounded ends similar to trough 10 and may be formed in the same manner. The top of the trough is however entirely open as indicated at 61, the container being rigidified by rolling its upper edge into an out-turned lip 62. Preferably the lip lies in a substantially horizontal plane so that a flat sheet may be rested thereon to cover the contents of the trough. If the trough is formed by butt-welding "bumped heads" to a cylindrical body along the lines 16 in Fig. 11, the heads are first sliced off so as to make the flattened part level with the upper edges of the trough. A trough modified in this manner retains the advantages of easy cleaning and is less costly to fabricate since it omits the cover and cover retaining means.

In Figs. 13 and 14 I have illustrated another modified trough 70 which is in all respects similar to trough 10, including the slide cover, except that the trough opening 71 is of shorter length. This is desirable under certain circumstances. When an opening of such relatively reduced length is provided, the end portions of the trough are longer and correspondingly less accessible for cleaning. In such case it is desirable to form the end portions in two parts hinged together at 76 so that the upper part 72'—73' may be rotated to an open position as indicated in dot-and-dash lines. In this position an abutment member 77 rests against the lower part of the trough for holding the hinged part at a desired and accessible level. It will be understood that such opening of the end portions is performed only after the cover 30 (not shown in these figures) has been moved and latched in its open position to free the part 73' for movement. A latching mechanism 78 may be utilized for fastening the part 73' in its closed position.

The lengthened end portions may be formed by butt-welding a cylindrical extension 73 to the body of the trough and to bumped head 72 along the lines 74. The end may then be split or sawed along the line 75 at a level with the edges of opening 71 to form the upper part 72'—73' which may then be hinged to the lower portion of the trough at 76.

It will be understood that modifications in the structural details illustrated may be made by those skilled in the art without necessarily departing from the scope and spirit of the invention as expressed in the appended claims. It is therefore intended that these details be interpreted as illustrative only.

Having thus described and illustrated my invention, what I desire to secure by grant of Letters Patent is:

1. A dough trough comprising a cylindrical container having end walls and an opening in the cylindrical portion, said end walls merging gradually into the cylindrical portion so as to present a smooth continuous interior surface, and a cylindrically curved closure for said opening, said closure comprising a flat rectangular sheet of material curved into cylindrical shape and having an under surface whose radius of curvature is identical with that of the external surface of the container, said closure being adapted to rest directly against and to slide on said container from an open position to a closed position covering the opening, said container being provided with a plurality of circumferentially spaced closure retaining brackets each of which presents a face of relatively minute area toward the cylindrical surface of the container, the closure being guided by said brackets and establishing tangential contacts with them.

2. A dough trough as defined in claim 1, said closure being provided along its side edges with cut-outs adapted to register with certain of said brackets to permit removal of the closure if desired.

3. A dough trough as defined in claim 1, said closure being provided along its side edges with cut-outs adapted to register with certain of said brackets to permit removal of the closure if desired, said cut-outs being so positioned that the registry is effected only when the closure is purposely brought into a position other than said fully open or closed positions.

4. A dough trough comprising a cylindrical container having walls closing the ends of the container and an opening in its cylindrical portion having front and rear edges parallel to the cylinder axis, the end portions of the container on each side of said opening being formed of two parts hinged together, the hinge axis being substantially in alignment with the rear edge of said opening, whereby the upper part of each end of the container may be swung away from its complementary part to open the end for access to clean the interior surface at said end.

5. A dough trough constructed as set forth in claim 4 wherein said container is provided with a cylindrical cover slideable on said cylindrical portion from an open position to a closed position covering said opening, and circumferentially spaced brackets carried by said end portions adjacent the side edges of said opening and engaging the side edges of said cover for retaining the cover against said container in concentric relation thereto, the end portions of the container being prevented from swinging to open the ends except when said slide cover is in its fully open position.

CHARLES E. MISCH.

References Cited in the file of this patent

UNITED STATES PATENTS

| Number | Name | Date |
| --- | --- | --- |
| 741,603 | Wilson | Oct. 13, 1903 |
| 947,701 | Raymond | Jan. 25, 1910 |
| 1,214,158 | Hansen | Jan. 30, 1917 |
| 1,295,830 | Lane | Feb. 25, 1919 |
| 1,485,995 | Schaffer | Mar. 4, 1924 |
| 1,564,472 | Daly et al. | Dec. 8, 1925 |
| 1,907,836 | Lauterbur | May 9, 1933 |
| 2,281,407 | Bohnsack | Apr. 28, 1942 |
| 2,312,586 | Plourde | Mar. 2, 1943 |
| 2,370,304 | Grant | Feb. 27, 1945 |
| 2,455,132 | Matthews et al. | Nov. 30, 1948 |
| 2,472,582 | Green | June 7, 1949 |